(12) United States Patent
Giousouf et al.

(10) Patent No.: US 6,866,060 B2
(45) Date of Patent: Mar. 15, 2005

(54) VALVE MEANS

(75) Inventors: Metin Giousouf, Esslingen (DE);
Michael Weinmann, Plüderhausen (DE)

(73) Assignee: Festo AG & Co., Esslingen (DE)

( * ) Notice: Subject to any disclaimer, the term of this patent is extended or adjusted under 35 U.S.C. 154(b) by 179 days.

(21) Appl. No.: 10/244,768

(22) Filed: Sep. 16, 2002

(65) Prior Publication Data

US 2003/0056828 A1 Mar. 27, 2003

(30) Foreign Application Priority Data

Sep. 25, 2001 (DE) .................................. 201 15 733 U

(51) Int. Cl.⁷ .............................................. F16K 7/00
(52) U.S. Cl. ................................................. 137/454.2
(58) Field of Search ........................ 137/454.2, 454.6, 137/884

(56) References Cited

U.S. PATENT DOCUMENTS

| 3,347,260 A | * | 10/1967 | Lewis, Sr. et al. ....... 137/454.6 |
| 5,095,936 A | * | 3/1992 | Briet et al. ............... 137/454.6 |
| 5,123,591 A | * | 6/1992 | Reynolds .................. 137/454.2 |
| 5,144,982 A | * | 9/1992 | Willbanks ................... 137/884 |
| 5,640,995 A | | 6/1997 | Packard et al. ............. 137/884 |

FOREIGN PATENT DOCUMENTS

| DE | 4221089 A1 | 1/1994 |
| DE | 19909069 C2 | 9/2000 |
| EP | 0497534 A2 | 8/1992 |
| WO | WO 97/47013 | 12/1997 |

\* cited by examiner

Primary Examiner—Stephen M. Hepperle
(74) Attorney, Agent, or Firm—Hoffmann & Baron, LLP

(57) ABSTRACT

A valve means having at least one microvalve secured in a substrate structure. For holding it in position the microvalve is clamped in rubber-elastic substrate material of the substrate structure. As a result simple and economic fitting of the valve is possible.

20 Claims, 3 Drawing Sheets

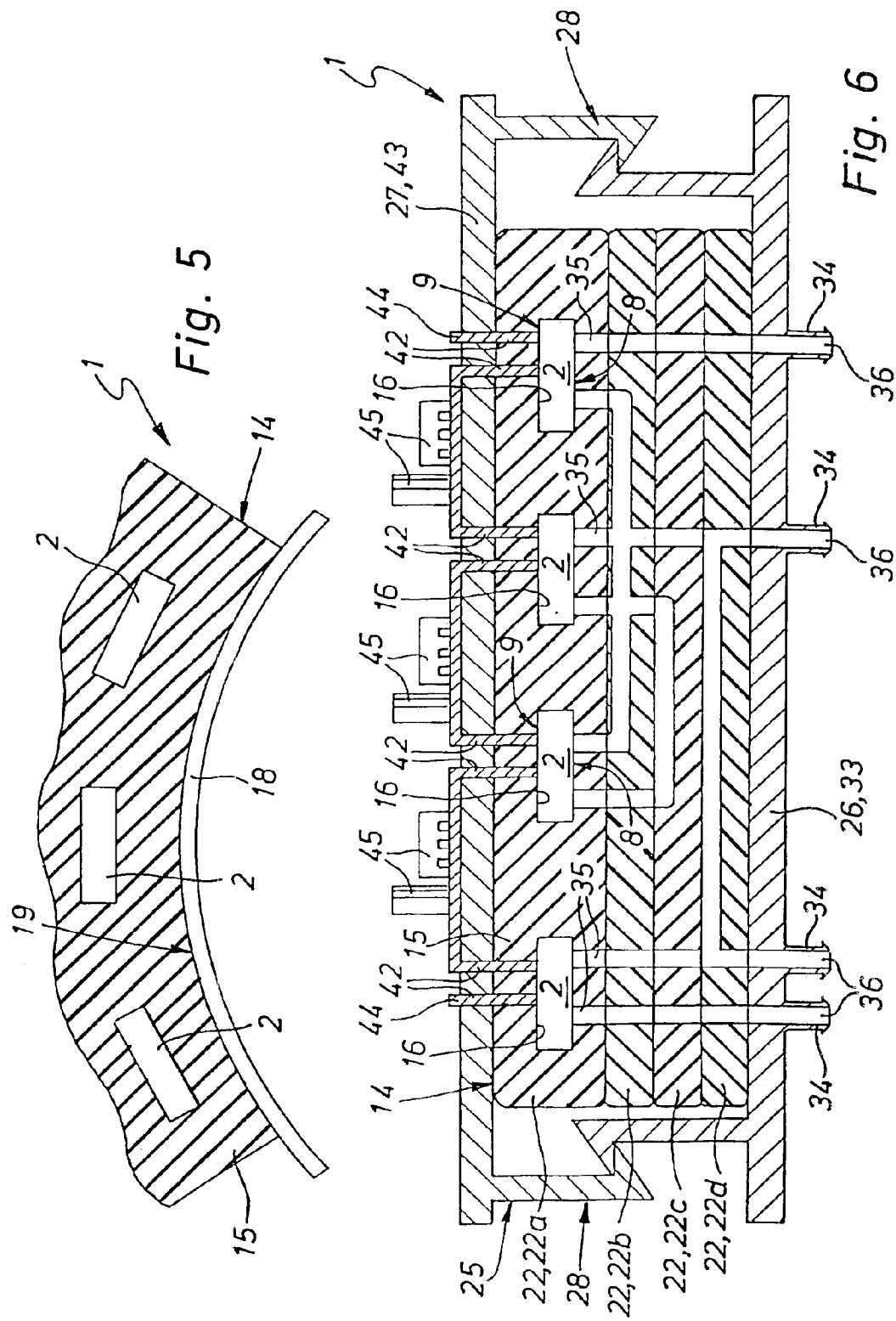

VALVE MEANS

BACKGROUND OF THE INVENTION

The invention relates to a valve means comprising at least one microvalve secured to a substrate structure.

THE PRIOR ART

In the case of a valve means of this type as disclosed in the U.S. Pat. No. 5,640,995 a plurality of microvalves are secured to a substrate structure comprising a plurality of layers. The substrate structure may for instance comprise printed circuit boards or ceramic materials. In the case of the working examples described the microvalves are secured to the surface of a printed circuit board. In this case extremely stringent requirements must be complied with as regards the evenness and freedom from distortion of the printed circuit board. Production and assembly of the valve means is consequently relatively involved.

SHORT SUMMARY OF THE INVENTION

One object of the present invention is to provide a valve means of the type initially mentioned allowing simpler and more economic fitting or assembly of the valve means.

In order to achieve these and/or other objects appearing from the present specification, claims and drawings, in the present invention the valve means is gripped in rubber-elastic substrate material of the substrate structure.

Securing one or more microvalves on a substrate structure is accordingly implemented by gripping in substrate material having the rubber-elastic properties. This substrate material is in a position of developing sufficient holding forces for reliably securing the respective microvalve. On the other hand it can automatically adapt itself to the shape of the microvalve so that even substantial manufacturing inaccuracies may be allowed for, something simplifying the production and assembly or fitting of the microvalves. Finally, the rubber-like elasticity of the substrate material may also lead to mechanical decoupling of the microvalve from its surroundings; impacts transmitted to the substrate material will only at the most cause a slight loading of the structure of the microvalve.

As a material for the substrate material rubber or elastomeric plastic comes into question, for example, a foam-like structure being possible. The substrate material may then consist throughout of one and the same material or it may be formed by different materials.

Further advantageous developments of the invention are defined in the claims.

It is more particularly advantageous to provide the substrate material with at least one recess forming a pocket, into which pocket the microvalve is inserted. The pocket is preferably so dimensioned that the substrate material is elastically deformed by the inserted microvalve and the microvalve is accordingly acted upon to hold it. During assembly by insertion the microvalve is simply inserted into the pocket and is held therein by a force fit to a sufficient extent in reliable manner.

There is furthermore the possibility of clamping a microvalve between two separate rubber-elastic layers of substrate material. For instance, the microvalve is placed between two layers of substrate material, which are then biased or braced by suitable loading means from opposite sides against the microvalve. In the mounted state the microvalve may be surrounded by the substrate material completely.

More particularly when the substrate material is formed with at least one pocket for the insertion of a microvalve, it is possible for the holding force causing the clamping of the microvalve to be exclusively provided by the substrate material itself, which is deformed during fitting of the microvalve elastically so that a return force of the substrate material acts on the microvalve.

To the extent that the valve means is provided with loading means, same will conveniently comprise two tabular or plate-like loading bodies, between which the substrate material is located and which are biased by suitable clamping means from opposite sides against the substrate material. The clamping means will conveniently act directly between the loading bodies and may for example be constituted by interlocking means and/or resiliently elastic clamps.

There is the possibility of providing electrical conductors leading to at least one microvalve in the substrate material. Furthermore, the substrate material may have fluid ducts running to at least one microvalve. Such electrical conductors and/or fluid ducts are preferably installed even before fitting the at least one microvalve in the substrate material and in it lead to different points, at which a microvalve is placed. This means that the respectively installed microvalve communicates directly with the fluid ducts incorporated in the structure of the substrate material, the substrate material itself performing the necessary sealing function. In a similar fashion a direct electrical contact may be produced with the microvalve.

If in the substrate material both electrical conductors and also fluid ducts are present, a functionally specific selection of the substrate material is recommended. For instance, an electrically conductively structured material may find application on the side, which serves for producing electrical contact, of the microvalve, whereas on the opposite side, serving for producing the fluid connection, of the microvalve a material will be selected possessing particularly satisfactory sealing properties.

The rubber-elastic properties of the substrate material may also permit adapting the shape to suit local features involved without impairing integration of the microvalves.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 5 shows a further example of the valve means to illustrate the flexibility as regards designing the shape of the substrate material.

FIG. 6 is a longitudinal section taken through a further design of the valve means in accordance with the invention, whose substrate material possesses a multi-layer structure.

DETAILED ACCOUNT OF WORKING EMBODIMENTS OF THE INVENTION

Figure 2:
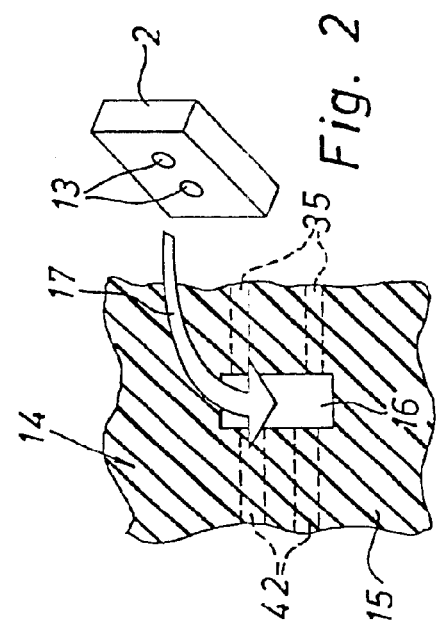
FIG. 2 shows a part of the valve means of FIG. 1 in order to make clear the fitting of the microvalve.

The valve means generally referenced 1 as a whole are respectively provided with one or more microvalves 2.

Irrespectively of the specific embodiment the valve means 1 provided with only one microvalve 2 may also comprise a plurality of microvalves 2 and vice versa.

The microvalves 2 are self-contained, complete valves, which have valve housing 3, wherein at least one moving valve member 4 is accommodated. Dependent on the instantaneous position of switching of the valve member 4 there will be a conduction-enabling state and/or an interruption of a fluid connection between a plurality of valve ducts 5. The microvalves 2 present in the working examples possess a 2/2 valve functionality, although higher order functionalities would be possible, as for instance in the form of so-called 3/2 way valves.

Each microvalve 2 is provided with drive means 6 by which the switching position of the valve member 4 may be set. Preferably it is a question of electrically activated drive means 6 as is the case in the working embodiment. The drive means 6 may for instance be on the basis of an electrostatic principle of functioning.

The valve ducts 5 open at valve duct openings 7 at the outer face of the valve housing 3. All valve duct openings 7 are preferably located at the same outer face of the housing, which in the following will be termed the first outer face 8 of the housing.

The drive means 6 possess electrical contact means 12 for the supply of the electrical operating signals. Furthermore, they are extended to the outer face of the valve housing 3, where they terminate at first electrical contact faces 13. It is preferred for all first electrical contact faces 13 to be arranged on one and the same outer face of the housing, which in the following will be referred to as the second outer housing face 9. The first and the second outer faces 8 and 9 of the housing are preferably located on mutually opposite sides of the valve housing 3.

The microvalves 2 preferably possess a micromachined structure. They can be produced using methods which are conventional in microsystem technology, as for example using silicon etch methods or plastic molding. In addition to the already mentioned principle of functioning it would also be possible to provide a piezoelectric, magnetostrictive or memory metal principle of operation.

In order for the microvalves 2 to be able to be employed purposefully for mounting them a substrate structure generally referenced 14 is required. It is by way of such substrate structure that the mechanical, electrical and fluid connection takes place to the macro-surroundings of the respective microvalve. The substrate structure 14 may hence be for instance employed in order to transmit the necessary electrical signals and to make possible the exchange of fluid.

In the case of all working examples the substrate structure 14 comprises rubber-elastic substrate material 15 between which the respective microvalve 2 is firmly held. It is solely such holding or clamping effect in the substrate material 15 possessing rubber-elastic properties, which is responsible for the attachment of the microvalve 2. There is more especially no direct connection with a rigid substrate material as is normally the case in the prior art.

The substrate material 15 preferably consists of rubber or an elastomeric plastic. In order to ensure a particularly high degree of flexibility a foam-like structure with air-filled cavities may be employed.

Figure 1:
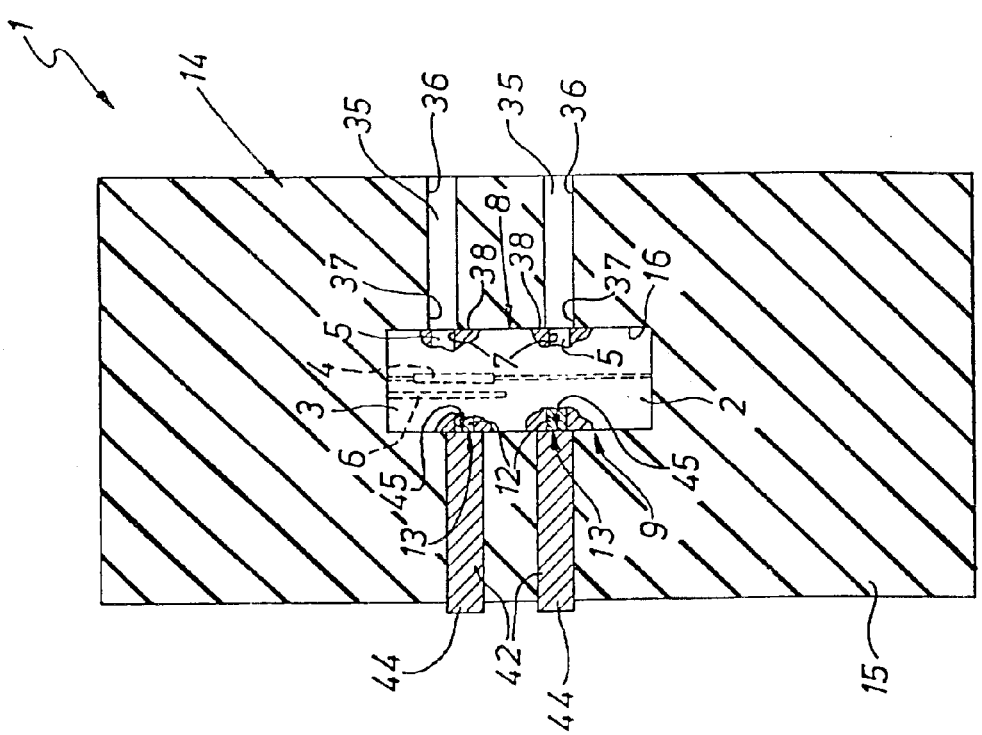
FIG. 1 shows a valve means fitted with only one microvalve in partial section.

In the working embodiment illustrated in FIGS. 1 and 2 the microvalve 2 possesses a well open at the outer face of the substrate material 15 and which may be termed a pocket 16. During fitting the microvalve 2 is simply inserted into the pocket 16, as is indicated in FIG. 2 by the arrow 17.

The dimensions of the pocket 16 are preferably so selected that there is a certain degree of undersize and accordingly the microvalve 2 is to be thrust into the pocket with a sufficient degree of force in the pocket 16. On thrusting into position for fitting the substrate material 15 is elastically deformed, the resulting return force of the rubber-elastic material providing the holding force necessary for securing the microvalve 2 in position. The holding force caused by the elastic deformation of the substrate material 15 may be the only holding force which acts on the microvalve 2.

The design may be such that the microvalve 2 is only force fitted in the pocket 16, that is to say held in the pocket 16 by the resulting frictional forces. It is however also possible to have measures which additionally cause an interlocking action for securing in position. For instance, the outer face of the microvalve 2 could be provided with one or more pits and/or humps, which in the fitted state would contact the resilient substrate material 15.

Figure 3:
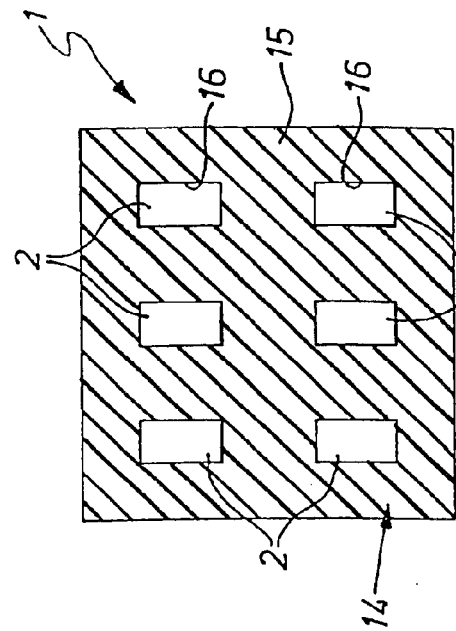
FIG. 3 is a plan view of a further working embodiment of the valve means, which is fitted with a plurality of microvalves.

The structure of the valve means 1 depicted in FIG. 3 is the same as that shown in FIGS. 1 and 2 with the difference that a plurality of microvalves 2 are held by the same rubber-elastic substrate material 15 simultaneously. In the substrate material 15 a plurality of pockets 16 are formed in any desired arrangement, in which a respective microvalve 2 is inserted.

It would be feasible as well for one and the same pocket 16 to have a plurality of microvalves 2 placed therein.

The structure of the valve means 1 in accordance with FIG. 5 is in principle the same as that of FIG. 3, although however the substrate structure 14 additionally possesses a substrate body 18 with a curved support face 19, on which the substrate material 15 is placed. It is clear that the rubber-elastic substrate material 15 is in a position to adapt its shape to suit the form of the support face 19. The valve means may be mounted on three-dimensionally curved support faces if necessary.

The substrate body 18 can also possess an even support face, for instance in order to place a substrate material 15 thereon, which has an even outer face, as is the case with the valve means 1 in accordance with FIGS. 1 and 2.

The substrate material 15 may for example be bonded to the substrate body 18.

The substrate body 18 may also be an independent or self-contained body, which does not belong to the support structure 14 and which for example is provided on a fluid power device, which is to be fitted the with a valve means 1.

In the working embodiment illustrated in FIG. 6 once again a plurality of microvalves 2 are placed in receiving pockets 16 in the substrate material 15. With the exception of the outer face facing the pocket opening the microvalves 2 are completely surrounded by the substrate material 15. The substrate material 15 is in this case preferably a uniform material.

However the working embodiment in accordance with FIG. 6 makes it clear that the substrate material may have a layered structure. More particularly, it comprises a plurality of layers 22 of substrate material placed flatwise together, the microvalves 2 being arranged within at least one and preferably within one and the same substrate material layer 22*a*.

Figure 4:
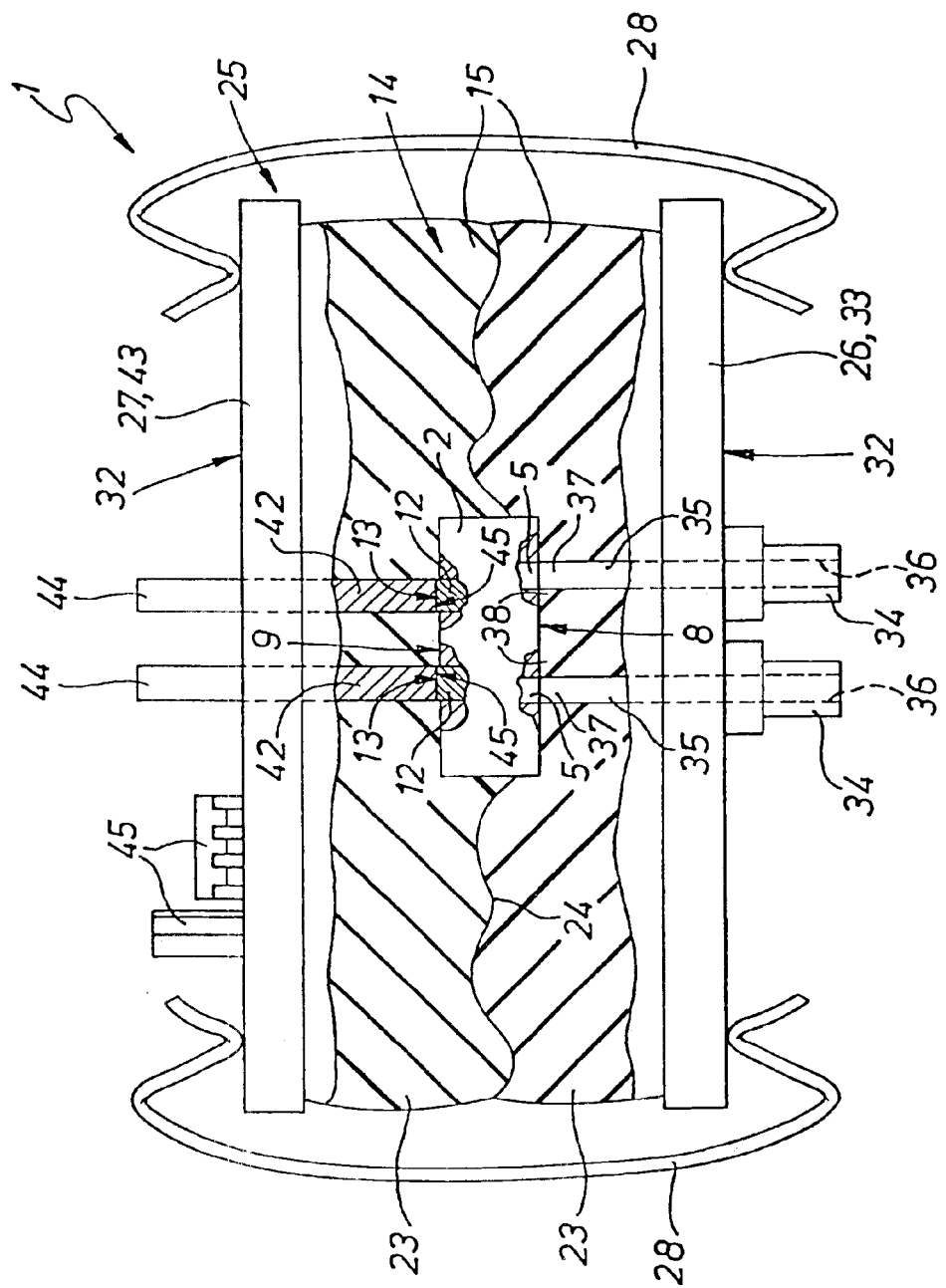
FIG. 4 shows a still further embodiment of the valve means clamped between two separate rubber-elastic layers of substrate material.

In the case of the working example of the invention depicted in FIG. 4 the rubber substrate material 15 is also composed of several layers 23 of substrate material, it being preferably a question of exactly two substrate material layers 23. Departing from the design of FIG. 6 the at least one microvalve 2 is however arranged and clamped between the two rubber-elastic substrate material layers 23. Accordingly there is no need for molding pocket-like recesses in the substrate material 15.

In order to assemble the valve means 1 depicted in FIG. 4 the microvalve 2 may be placed, with the layers of substrate material 23 still separate from one another, at the position intended for it on the one layer 23 of substrate material, following which the other layer 23 of substrate material is placed in position from the other opposite side and finally the two layers 23 are now clamped together from opposite sides with the microvalve 2.

The dimensions of the layers 23 of substrate material may for instance be so selected that same do not project at all or only project to a slight extent past the microvalve 2. In the case of the working example of FIG. 4 a larger size or extent is selected so that the layers 23 of substrate material may be bent around during the mutual biasing and clamping around the microvalve 2 and there is a flat contact between the layers 23 of substrate material right around the microvalve 2. The contact face marked at 24 in FIG. 4 between the layers 23 of substrate material may be even or uneven in shape, to wit in a manner dependent on the geometry of the mutually facing surfaces of the layers 23 of substrate material.

If the microvalve 2 in accordance with FIG. 4 is completely surrounded by the substrate material 15, there will be particularly efficient protection against external effects. The microvalve 2 is securely embedded in the rubber-elastic substrate material 15.

Moreover, in the case of the other working examples of the invention there is certainly a possibility of closing the opening of the pockets 16 after the insertion of a microvalve 2 therein. For instance a cover lid may be provided, which may be secured in like a closure plug in the pocket 16. In the case of such a design the pocket's depth as measured in the direction of insertion of the microvalve 2 will be selected to be larger than the similarly measured overall length of the microvalve 2 so that when the microvalve 2 is completely inserted only an area will remain at the pocket opening which may be at least partly occupied by the cover lid.

If the inherent resilience or bracing effect of the material is not sufficient to securely hold a microvalve 2 in a pocket 16 (see FIG. 6) or if a microvalve 2 is to be secured between separate layers 23 of substrate material (FIG. 4), it is best to have an arrangement with loading means 25 which are in a position to so load the substrate material 15 that holding forces are produced which are sufficient to secure the respective microvalve.

In accordance with FIGS. 4 and 6 the loading means 25 can comprise two preferably tabular first and second loading bodies 26 and 27, between which the substrate material 15 is sandwiched. The planes of extent of the loading bodies 26 and 27 preferably extend in parallelism to the those of the associated layers 22 and 23 of substrate material.

The outline of the loading bodies 26 and 27 is preferably so selected that the entire outline of the layers 23 of substrate material is covered over.

The loading means 25 furthermore comprise suitable clamping means 28, with which the two loading bodies 26 and 27 may be drawn together so that same are braced from opposite sides toward the substrate material 15 and the microvalves 2 are subjected to a firm but nevertheless elastically yielding clamping effect.

In the working embodiment illustrated in FIG. 4 the clamping means 28 are constituted by resiliently elastic clamps, which bridge over the distance apart between the two loading bodies 26 and 27 and are biased toward the oppositely facing outer faces 32 of the loading bodies 26 and 27. The resiliently elastic clamps consist for example of spring steel and may have a yoke-like form.

In the working embodiment illustrated in FIG. 6 the clamping means 28 are constituted by interlocking means, which are secured to the two loading bodies 26 and 27 and which interlock in a position in which the loading bodies 26 and 27 are moved so far together that the desired degree of clamping on the substrate material 15 is produced.

In the case of working examples of FIGS. 4 and 6 the first loading body 26 simultaneously constitutes a connection body 33 which is provided with connection means 34, on which fluid ducts, for instance fluid hose not illustrated in detail, may be connected. The connection means 34 can be designed in the form of plug connection means.

The connection means 34 communicate respectively with at least one fluid duct 35 which extends through the substrate material 15 and leads to at least one microvalve 2. The fluid ducts 35 constitute the fluid connection between the microvalves 2 embedded in the substrate material 15 and connection openings 36, accessible from the outside, the connection openings 36 being defined by the connection means 34 in the case of the working embodiments of FIGS. 4 and 6.

In the case of the other working embodiments such fluid ducts 35 are provided as well, although they are not depicted in all figures. As shown in FIG. 1, the connection openings 36 may be constituted directly by the terminal section of fluid ducts 35 opening at an outer face of the substrate material 15 if there is no connection body 33.

The fluid ducts 35 provided for connection with a microvalve 2 respectively open at a fluid duct opening 37 on that face section of the substrate material 15, at which the microvalve 2 is engaged with the first outer housing face 8 in the braced state. The arrangement is so selected that when the microvalve 2 is fitted in position the valve duct openings 7 and the fluid duct openings 37 are opposite to one another in pairs. Because the substrate material 15 has its material 38 surrounding the fluid duct openings 37 in engagement with the microvalve 2 in a sealing manner around the associated valve duct opening 37, there is an extremely reliable, sealed fluid connection. Since the direction of the force, with which the substrate material 15 is braced against the microvalve 2 preferably coincides with the alignment of the duct openings 7 and 37, the bracing together will simultaneously provide the necessary sealing force.

In the working embodiment illustrated in FIG. 6 the multi-layer structure of the substrate material 15 also serves to provide extremely adaptable courses of the fluid ducts between the connection openings 36 and the microvalves 2 or between different microvalves 2. A plurality of layers 22b, 22c and 22d of substrate material contain internal length sections of the fluid ducts 35, which complement each other to provide the desired duct array when the layers of substrate material are put together. Commensurate with the complexity of the desired fluid circuit the number of the corresponding layers of substrate material may be varied. The mutual sealing at the aligned duct transitions may be directly ensured by the use of a rubber-elastic substrate material.

At this point it is to be noted that the valve means 1 may be operated both with a hydraulic medium and also gaseous mediums, more especially compressed air.

Electrical conductors 42 run in the substrate material 15 by way of which electrical drive means 6 of the microvalves 2 receive the actuating signals for operation. The electrical conductors 42 are in the working example constituted by conductor elements separate from the substrate material 15 and which run through the substrate material 15.

In the working embodiment illustrated in FIGS. 4 and 6 the electrical conductors 42 extend from a preferably tabular contact making body 43, which in the present case is formed with the second loading body 27. Electrical contact means 44 are provided on the contact making body 43, such means 44 rendering possible the supply of the electrical actuating signal and which may be in the form of a part of the electrical conductors 42. In the design of FIGS. 1 and 2 the electrical contact making means 44 may be direction constituted by the terminal sections, extending from the substrate material 15, of the electrical conductors 42.

The contact making body 43 may if necessary be provided with electrical and electronic components 45, which are required for the electrical control of the microvalves 2. They are connected in a suitable fashion with the necessary electrical conductors 42.

In accordance with a preferred embodiment the contact making body 43 is in the form of a printed circuit board.

The electrical contact between the electrical conductors 42 of the substrate material 15 and the electrical contact making means 12 of the microvalves 2 is preferably produced merely by a force-loaded physical contact without plug connection means. In accordance with FIGS. 1 and 4 the electrical conductors 42 terminate at a respective terminal electrical contact face 45 at that face section of the substrate material 15, which faces the second outer housing face 9 of the microvalve 2. The arrangement is such that the first and the second electrical contact faces 13 and 45 are opposite each other in pairs and are biased toward one another. This means that during assembly of the microvalves 2 it is not only the fluid but also electrical connections which are produced.

If a microvalve 2 is clamped between two layers 23 of substrate material it is possible in accordance with FIG. 4 for the fluid ducts 35 to be formed in the one layer 23 of substrate material and for the electrical conductors 42 to be formed in the other layer. It is in this manner that there is a possibility of selecting the materials for the substrate material 15 in accordance with the specific function. For instance, the layer 23 containing the fluid ducts 35 could be selected to have optimum fluid sealing properties, whereas the layer 23 containing the electrical conductors 42 could be manufactured of material structured to be electrically conductive in order to render possible an integral form of the electrical conductors 42.

Generally the electrical conductors may be formed both by conductor element embedded in the substrate material 15 and/or by electrically conducting regions of the substrate material 15, the latter case involving for example the use of anisotropically conductive plastics.

The unitary system, produced in accordance with the working examples of FIGS. 4 and 6, of the loading bodies 26 and 27, of the connection body 33 and of the contact making body 43 is not absolutely necessary. Dependent on the particular case it is possible to have either only loading bodies 26 and 27 or only one body 33 and/or a contact making body 43. As shown in FIG. 1, it is possible to completely dispense with such bodies.

What is claimed is:

1. A valve means comprising:
   at least one microvalve, a substrate structure to which the microvalve is secured in rubber-elastic substrate material as part of the substrate structure and wherein the rubber-elastic substrate includes an opening therein forming a pocket, and the at least one microvalve is inserted in the pocket.

2. The valve means as set forth in claim 1, wherein such pocket has such dimensions that the substrate material is elastically deformed by the inserted microvalve and the microvalve is thereby acted on with a retaining action.

3. The valve means as set forth in claim 1, wherein at least one microvalve is clamped between two separate rubber-elastic layers of such substrate material.

4. The valve means as set forth in claim 1, wherein at least the retaining forces responsible for holding the at least one microvalve are exclusively produced by elastic deformation of the substrate material caused during fitting the microvalve in position.

5. The valve means as set forth in claim 1, comprising loading means for loading the substrate material for the purpose of producing holding forces clamping at least one microvalve in position.

6. The valve means as set forth in claim 5, wherein the loading means comprise two tabular loading bodies, between which the substrate material is arranged and which are biased from opposite sides against the substrate material.

7. The valve means as set forth in claim 6, comprising clamping means for mutually bracing the loading bodies.

8. The valve means as set forth in claim 7, wherein such clamping means include interlocking means and/or at least one resiliently elastic clamp.

9. The valve means as set forth in claim 1, comprising electrical conductors extending in the substrate material to the at least one microvalve, such electrical conductors being preferably solely connected by touching contact with the respective microvalve.

10. The valve means as set forth in claim 9, wherein the electrical conductors are constituted by conductor elements embedded in the substrate material and/or by electrically conducting parts of the substrate material.

11. The valve means as set forth in claim 9, wherein the electrical conductors at least in part lead to a tabular contact making body mounted on the substrate material, such contact making body being preferably in the form of a printed circuit board.

12. The valve means as set forth in claim 1, wherein fluid ducts extend in the substrate material and lead to at least one such microvalve.

13. The valve means as set forth in claim 12, wherein the fluid connection between the fluid ducts and the associated microvalve is at least partly produced by having the substrate material in sealing contact with the material surrounding the respective fluid duct opening at the microvalve.

14. The valve means as set forth in claim 12, wherein the fluid ducts lead at least partly to a connection body of tabular form, mounted on the substrate material, such connection body being provided with connection means for fluid ducts.

15. The valve means as set forth in claim 1, wherein the substrate material comprises a plurality of layers of substrate material assembled flatwise and in which fluid duct sections extend which communicate with each other.

16. The valve means as set forth in claim 11, wherein the loading means comprise two tabular loading bodies, between which the substrate material is arranged and which are biased from opposite sides against the substrate material and wherein the contact making body and/or the connection body simultaneously constitute a loading body as part of the loading means.

17. The valve means as set forth in claim 1, wherein the substrate material comprises at least two different materials.

18. The valve means as set forth in claim 1, wherein the substrate material includes rubber or an elastomeric plastic.

19. The valve means as set forth in claim 1, comprising a plurality of microvalves retained in position by the same rubber-elastic substrate material.

20. A valve means comprising:

at least one microvalve, a substrate structure to which the at least one microvalve is secured in rubber-elastic substrate material as part of the substrate structure and wherein the at least one microvalve is clamped between two separate rubber-elastic layers of the substrate material, the two rubber elastic layers engage each other over an area surrounding the microvalve to retain the microvalve between the two layers.

* * * * *